US012762254B2

(12) United States Patent
Ghiold et al.

(10) Patent No.: US 12,762,254 B2
(45) Date of Patent: Oct. 13, 2026

(54) DETECTION OF OVER-PRIVILEGED ACCESS PERMISSIONS

(71) Applicant: Capital One Services, LLC, McLean, VA (US)

(72) Inventors: Matthew A. Ghiold, Glen Allen, TX (US); Gavin McGrew, Henrico, VA (US); Devon Powley, Reston, VA (US); Christopher Schultz, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/333,425

(22) Filed: May 28, 2021

(65) Prior Publication Data

US 2022/0382888 A1 Dec. 1, 2022

(51) Int. Cl.
*G06F 21/60* (2013.01)

(52) U.S. Cl.
CPC .................................. *G06F 21/604* (2013.01)

(58) Field of Classification Search
CPC ..................................................... G06F 21/604
See application file for complete search history.

(56) References Cited

U.S. PATENT DOCUMENTS

| | | | |
|---|---|---|---|
| 7,171,459 B2 | 1/2007 | Sanghvi et al. | |
| 9,916,450 B2 | 3/2018 | Moloian et al. | |
| 10,021,138 B2 | 7/2018 | Gill et al. | |
| 10,122,757 B1 | 11/2018 | Kruse et al. | |
| 10,148,701 B1 * | 12/2018 | Hecht | G06F 9/455 |
| 10,225,152 B1 | 3/2019 | Roth et al. | |

(Continued)

FOREIGN PATENT DOCUMENTS

| | | |
|---|---|---|
| CN | 109829314 A | 5/2019 |
| WO | 2019244036 A1 | 12/2019 |

OTHER PUBLICATIONS

International Search Report and Written Opinion of the International Searching Authority directed to related International Patent Application No. PCT/US22/31390, mailed Aug. 25, 2022; 7 pages.

(Continued)

*Primary Examiner* — Daniel B Potratz
*Assistant Examiner* — Forrest L Carey
(74) *Attorney, Agent, or Firm* — Sterne, Kessler, Goldstein & Fox P.L.L.C.

(57) ABSTRACT

Disclosed herein are system, method, and computer program product embodiments for evaluating whether or not a role has an over-privileged access permission contained in a set of effective access permissions to a system resource defined in a first security policy and a second security policy. The method includes comparing a scope of a name for the system resource defined in the first security policy with a permissible scope of the name for the system resource defined by a security rule to obtain a first comparison result; and comparing a scope of a name for the role defined in the second security policy with a permissible scope of the name for the role defined by the security rule to obtain a second comparison result. The method further includes determining, based on the first comparison result and the second comparison result, whether or not the role has the over-privileged access permission.

18 Claims, 5 Drawing Sheets

(56) References Cited

U.S. PATENT DOCUMENTS

| | | | |
|---|---|---|---|
| 10,430,606 | B1 | 10/2019 | Levit et al. |
| 10,664,312 | B2 | 5/2020 | Moloian et al. |
| 10,749,886 | B1 | 8/2020 | Kandel et al. |
| 10,754,506 | B1 * | 8/2020 | Moyal ................. G06F 3/04842 |
| 10,803,169 | B1 | 10/2020 | Flatten et al. |
| 10,944,561 | B1 | 3/2021 | Cahill et al. |
| 10,965,686 | B1 | 3/2021 | Agarwwal et al. |
| 11,194,764 | B1 * | 12/2021 | Adhikari ............... G06F 16/164 |
| 11,206,269 | B1 | 12/2021 | Van Deman |
| 11,368,492 | B1 | 6/2022 | Engers et al. |
| 2004/0078391 | A1 | 4/2004 | Excoffier et al. |
| 2007/0043771 | A1 | 2/2007 | Ludwig et al. |
| 2007/0073671 | A1 | 3/2007 | McVeigh et al. |
| 2008/0016580 | A1 | 1/2008 | Dixit et al. |
| 2012/0150912 | A1 | 6/2012 | Ripberger |
| 2013/0329738 | A1 | 12/2013 | Yamagata et al. |
| 2015/0026215 | A1 | 1/2015 | Goel et al. |
| 2015/0135257 | A1 | 5/2015 | Shah et al. |
| 2015/0370824 | A1 * | 12/2015 | Chui ....................... G06F 16/21 707/786 |
| 2016/0226880 | A1 * | 8/2016 | Moloian ................. G06F 21/57 |
| 2017/0034075 | A1 | 2/2017 | Burk et al. |
| 2017/0329957 | A1 | 11/2017 | Vepa et al. |
| 2018/0084012 | A1 | 3/2018 | Joseph et al. |
| 2018/0288063 | A1 | 10/2018 | Koottayi et al. |
| 2019/0007418 | A1 | 1/2019 | Cook et al. |
| 2019/0007443 | A1 | 1/2019 | Cook et al. |
| 2019/0073488 | A1 | 3/2019 | Kruse et al. |
| 2019/0236062 | A1 | 8/2019 | Proctor et al. |
| 2019/0253424 | A1 | 8/2019 | Burckhardt et al. |
| 2019/0272386 | A1 * | 9/2019 | Ley ..................... G06F 21/6245 |
| 2019/0327271 | A1 * | 10/2019 | Saxena ................... H04L 41/16 |
| 2019/0362087 | A1 | 11/2019 | Ferrans et al. |
| 2020/0007677 | A1 | 1/2020 | Bjontegard |
| 2020/0076812 | A1 | 3/2020 | Spurlock et al. |
| 2020/0120098 | A1 | 4/2020 | Berg et al. |
| 2020/0137097 | A1 | 4/2020 | Zimmermann et al. |
| 2020/0336489 | A1 | 10/2020 | Wuest et al. |
| 2020/0358778 | A1 | 11/2020 | Gopinathapai et al. |
| 2021/0182423 | A1 | 6/2021 | Padmanabhan |
| 2022/0159038 | A1 * | 5/2022 | Fandli ..................... H04L 63/20 |
| 2022/0335148 | A1 | 10/2022 | Gandhi et al. |

OTHER PUBLICATIONS

SDNShield: Reconciliating Configurable Application Permissions for SDN App Markets. Wen. IEEE. (Year: 2016).

ASCAA: API-level security certification of android applications. Pei. IET Software. (Year: 2017).

PoLPer: Process-Aware Restriction of Over-Privileged Setuid Calls in Legacy Applications. Jeon. ACM. (Year: 2019).

Extended European Search Report for European Application No. EP22812307, mailed on Mar. 12, 2025, 8 pages.

* cited by examiner

DETECTION OF OVER-PRIVILEGED ACCESS PERMISSIONS

BACKGROUND

Almost all computer applications involve access control (AC) to system resources. AC is concerned with determining the allowed activities of legitimate users, mediating every request by a role to access a system resource in the system. Identity and access management (IAM) is a framework of business processes, policies and technologies that facilitates the management of electronic or digital identities of roles and system resources. With an IAM framework in place, information technology managers can manage AC to information or system resources within their organizations. IAM systems can be deployed on premises, provided by a third-party vendor through a cloud-based subscription model, or deployed in a hybrid model. An IAM system can evaluate whether a role can access a system resource protected by the IAM system on a per-request basis. An IAM system can receive from a role a request to access a system resource and evaluate whether to grant or deny the requested access to the system resource. For security purposes, it is important for an IAM system to grant a role access only to the system resources the role is supposed to access. Accordingly, approaches are needed to ensure that the IAM system is limiting role access appropriately.

BRIEF SUMMARY

Disclosed herein are system, apparatus, device, method and/or computer program product embodiments, and/or combinations and sub-combinations thereof for determining, whether a role has an access permission to a system resource defined by a set of security policies that is over-privileged with respect to a set of security rules.

In some examples, a computer-implemented method performed by a system can include comparing a scope of a name for a system resource defined in a first security policy with a permissible scope of the name for the system resource defined in a security rule to obtain a first comparison result, and comparing a scope of a name for a role defined in a second security policy with a permissible scope of the name for the role defined by the security rule to obtain a second comparison result. Afterwards, the method includes determining, based on the first comparison result and the second comparison result, whether or not the role has an over-privileged access permission contained in a set of effective access permissions to the system resource defined by the first security policy and the second security policy. In addition, the method includes generating a notification to indicate a compliance status of the first security policy and the second security policy for the role based on whether or not the role has the over-privileged access permission.

In some examples, an apparatus for managing system resources can include a storage device configured to store a security rule set, and a processor communicatively coupled to the storage device. The processor can be configured to compare a scope of a name for a system resource defined in a first security policy with a permissible scope of the name for the system resource defined by a security rule to obtain a first comparison result, and compare a scope of a name for a role defined in a second security policy with a permissible scope of the name for the role defined by the security rule to obtain a second comparison result. Furthermore, the processor can be configured to determine, based on the first comparison result and the second comparison result, whether or not the role has an over-privileged access permission contained in a set of effective access permissions to the system resource defined by the first security policy and the second security policy. Afterwards, the processor can be configured to generate a notification to indicate a compliance status of the first security policy and the second security policy for the role based on whether or not the role has the over-privileged access permission.

In some examples, a non-transitory computer-readable medium can store instructions that, when executed by a processor, cause the processor to perform various operations. The operations can include comparing a scope of a name for a system resource defined in a first security policy with a permissible scope of the name for the system resource defined by a security rule to obtain a first comparison result, and comparing a scope of a name for a role defined in a second security policy with a permissible scope of the name for the role defined by the security rule to obtain a second comparison result. In addition, the operations can include determining, based on the first comparison result and the second comparison result, whether or not the role has an over-privileged access permission contained in a set of effective access permissions to the system resource defined by the first security policy and the second security policy. Furthermore, the operations can include generating a notification to indicate a compliance status of the first security policy and the second security policy for the role based on whether or not the role has the over-privileged access permission.

Descriptions provided in the summary section represent only examples of the embodiments. Other embodiments in the disclosure may provide varying scopes different from the description in the summary. In some examples, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
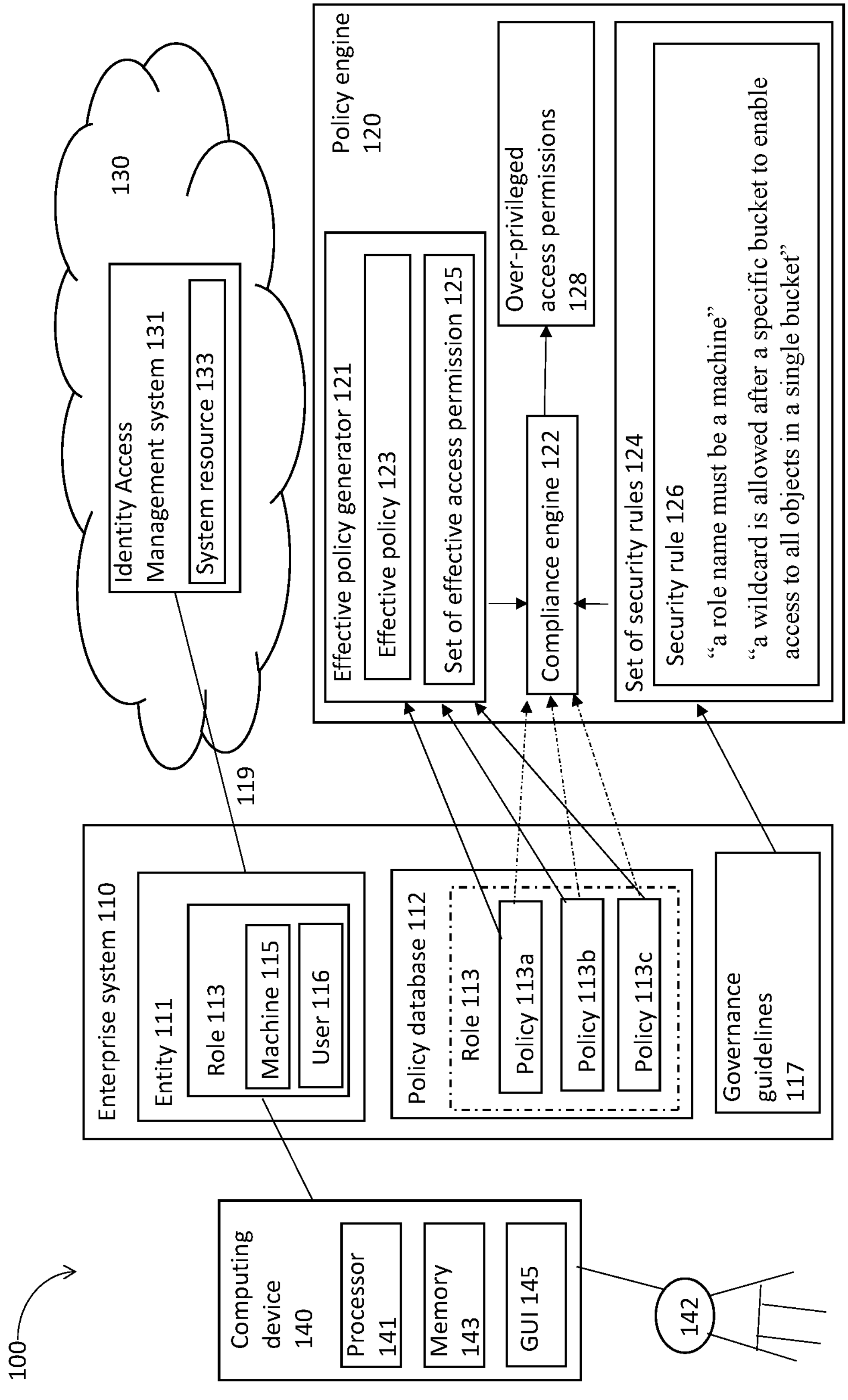
FIG. 1 is a block diagram of an environment for determining whether a role has an effective access permission defined by a set of security policies to a system resource that is over-privileged with respect to a security rule, according to some embodiments.

Identity and access management (IAM) is a framework of business processes, policies, and technologies that facilitates the management of electronic or digital identities of roles and system resources. IAM systems can provide access control to system resources by a role on a per-request basis. In general, an IAM system can grant or deny a request from a role to access system resources based on access permissions assigned to the role by one or more security policies. Such a request can be received from an enterprise system, and the request can identify the role. The following discussion presents interactions between an IAM system and an enterprise system, but one skilled in the art would understand that the interactions apply to any requesting system that seeks access to a system resource based on access controls. The requesting system is therefore not limited to an enterprise system but can include any system that uses roles and permissions as part of access control to the system resource.

The request-response dynamic between the IAM system and an enterprise system presents challenges to the requesting system. First, the requesting system is not informed of any potential issues with respect to roles in its system until a request is made to the IAM system. Any corrective action to its roles is therefore reactive and presents a potential security concern because roles are not evaluated until a request is made. This provides an opportunity for compromised and/or over-privileged roles (e.g., by a hacker) to be hijacked and used to improperly gain access to system resources. Second, the requesting system must rely on the IAM system in determining whether its roles are compliant with permission controls for accessing system resources.

The features described in this disclosure allow for an enterprise system to monitor access permission compliance of roles with access control (AC) for accessing system resources of an IAM system without any requests being made. Access privileges or permissions to system resources by a role are granted according to security policies. There are many kinds of security policies, which work together to provide effective access permissions for a role to access system resources. However, due to the complexity of many security policies, sometimes a role can have unintended, improper, or over-privileged access to some system resources for which the role should not have access to. For security reasons, it is important to prevent a role from having an over-privileged access permission to system resources. Hence, the enterprise system can detect over-privileged access permissions associated with a role in an IAM system without having to submit any requests to the IAM system. In some embodiments, the enterprise system can detect over-privileged access permissions because the operations are performed by a policy engine independent of the IAM system. Accordingly, the mechanisms discussed in the current disclosure are implemented by a machine with a specific arrangement, where the policy engine is separated from the IAM system to provide more security protection for the IAM system. In some embodiments, the enterprise system detecting over-privileged access permissions is separated from the IAM system.

In some examples, a role can be associated with a number of security policies, with each security policy defining a number of permissions for accessing different system resources. There may be different types of policies, such as identity-based policies whose permissions relate to an identity, resource-based policies whose permissions are for a specific resource, and permission boundaries whose permissions define a maximum scope of permissions that may be granted but do not define specific permissions. For example, an identity-based policy may control what actions a role can perform on a resource (and may also define the conditions); a resource-based policy may also define certain permissions on certain actions that can be performed on that resource. These permissions may overlap or even conflict in scope with respect to the level of access for role, for a system resource, or both. Because a role may be assigned more than one policy, the number of interactions between access permissions defined by multiple security policies may grow exponentially large as the number of roles and policies increases. For a requesting system with a large number of roles and a large number of policies, evaluation of each role and its associated permissions is neither efficient nor feasible. A set of effective access permissions provides a means for a system to efficiently evaluate all access permissions assigned to a role by resolving the interdependencies of the different access defined by all the security policies associated with a role.

Based on the set of effective access permissions, an enterprise system may perform preemptive evaluation of all access permissions associated with a role to identify roles that have over-privileged access permission to system resources. The preemptive evaluation of all access permissions can be performed with respect to a set of security rules, which can be defined by an enterprise or a corporation based on their security needs and some information security standards. Security rules based on information security standards can be used to implement information security controls to meet an organization's requirements and prevent from granting a role some over-privileged access to system resources. There are many information security standards, e.g., International Organization for Standardization (ISO)/International Electrotechnical Commission (IEC) 27000 series of standard. Security rules based on information security standards can demonstrate in a methodical and certifiable manner that an organization conforms to industry best practices and procedures.

A further technical benefit is the improvement in the functionality of the enterprise system which may now persistently monitor roles across the entire system, ascertaining non-compliance with permission controls established by the enterprise system and/or the IAM system, and provide corrective measures to the over-privileged role prior to any request being submitted to the IAM system. The enterprise system may preemptively identify any potential security concerns with regard to its roles such as over-privileged roles or roles that have been compromised and prevent any requests from that role being submitted to the IAM system. In this manner, the enterprise system may prevent security breaches associated with its roles before they occur.

FIG. 1 is a block diagram of an environment 100 for determining whether a role has an effective access permission defined by a set of security policies to a system resource that is over-privileged with respect to a security rule, according to some embodiments. Environment 100 can include enterprise system 110, policy engine 120, and IAM system 131, which may reside in a cloud computing system 130. In addition, enterprise system 110 can be communicatively coupled to a computing device 140 that can be used by a person 142.

In some examples, environment 100 can include a network formed by some or all of computing device 140, enterprise system 110, and cloud computing system 130. For example, environment 100 can include an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In some examples, cloud computing system 130 can include an environment that delivers computing as a service by sharing resources, services, etc. located in cloud computing system 130. Cloud computing system 130 can provide computation, software, data access, storage, and/or other services that do not require end-user knowledge of a physical location and configuration of a system and/or a device that delivers the services. In some examples, cloud computing system 130 can include Amazon® Web Services (AWS), Microsoft® Azure, Google® Cloud, IBM® Cloud, Oracle® Cloud Infrastructure, or any other cloud computing system.

Cloud computing system 130 can include IAM system 131, which can manage system resources 133. A system resource can be referred to as a resource. IAM system 131 can receive a request 119 for access to system resources 133 from entities in enterprise system 110 such as entity 111. IAM system 131 can include a plurality of data storage systems for storing system resources 133 to be accessed by enterprise system 110. IAM system 131 can include a database management system or relational database tool. IAM system 131 can further include a message queue or stream processing platform such as Apache Kafka or Apache Spark or other data storage systems like Apache Hadoop, Hadoop Distributed File System (HDFS), or Amazon S3, by way of non-limiting examples. IAM system 131 can be a data lake, data silo, semi-structured data system (comma-separated values file, logs, xml, etc.), unstructured data system, binary data repository, or other suitable repository. IAM system 131 can store thousands, millions, billions, or trillions (or more) of objects, rows, transactions, records, files, logs, etc. while allowing for the creation, modification, retrieval, archival, and management of this data.

System resources 133 can include hardware, e.g., processor, memory, storage, or software, e.g., operating system, application software, database, used for various computing purposes. Examples of system resources 133 can include Amazon Elastic Compute Cloud (Amazon EC2), Amazon Simple Storage Service (Amazon S3), Amazon DynamoDB, Amazon Redshift, an Amazon® Web Services (AWS) service, an EC2 instance, a S3 bucket, or a DynamoDB table, S3 Glacier vaults, Amazon Simple Notification Service (SNS) topics, or Amazon Simple Queue Service (SQS) queues. System resources 133 can be products or services provided by any other vendors besides Amazon®.

In some examples, computing device 140 can be a wireless communication device, a smart phone, a laptop, a tablet, a personal assistant, a monitor, a wearable device, an Internet of Thing (IoT) device, a mobile station, a subscriber station, a remote terminal, a wireless terminal, or a user device. Computing device 140 can be configured to operate based on a wide variety of wireless communication techniques. These techniques can include, but are not limited to, techniques based on 3rd Generation Partnership Project (3GPP) standards. In some other examples, computing device 140 can be a desktop workstation, a server, and/or embedded system, a computing device communicatively coupled to enterprise system 110 by wired lines, to name a few non-limiting examples, or any combination thereof. Person 142 can use computing device 140 to interact with enterprise system 110, and request system resources 133 managed by IAM system 131 and residing in cloud computing system 130. Computer device 140 can include processor 141, memory device 143, and a graphical user interface (GUI) 145.

In some examples, enterprise system 110 can include a server device (e.g., a host server, a web server, an application server, etc.), a data center device, or a similar device. Enterprise system 110 can include processors, an operating system, a storage coupled to processor, etc. Enterprise system 110 may be implemented as any system that requests access to resources 133 protected by IAM system 131 that utilizes security policies and access permissions for controlling access to requested resources.

In some embodiments, enterprise system 110 can include any number of entities, e.g., entity 111, a policy database 112, and a security governance guideline 117. In some examples, entity 111 can be resource objects to be used for authentication to access an account of IAM system 131. Entity 111 can include one or more roles, e.g., role 113. Policy database 112 can include one or more security policies, e.g., policy 113*a*, policy 113*b*, or policy 113*c*, associated with roles, e.g., role 113. A security policy can be referred to as a policy. Enterprise system 110 is communicatively coupled to policy engine 120, where operations about security policies and access permissions can be performed. In some embodiments, policy database 112 can be implemented separately from enterprise system 110, such as in policy engine 120 and/or IAM system 131 coupled to enterprise system 110. In some other embodiments, policy engine 120 can be implemented as a part of enterprise system 110.

Combined, the security policies, e.g., policy 113*a*, policy 113*b*, or policy 113*c*, can generate an effective policy 123, which can define a set of effective access permissions 125 by role 113 to access system resources 133. The generation of effective policy 123 and the set of effective access permissions 125 can be performed by an effective policy generator 121 within policy engine 120. The set of effective access permissions 125 represent the actual access permissions granted to role 113 by the security policies associated with role 113. More details of generation of the set of effective access permissions 125 are shown in FIGS. 3A-3D. In some examples, a system administrator creates the set of security policies that generates the set of effective access permissions 125 for role 113.

In addition, security governance guideline 117 defines a set of security rules 124 including various security rules, e.g., security rule 126. Security rule 126 can specify what kind of access permissions should be granted to various roles or system resources in an enterprise or an organization. As such, security rule 126 can set up the scope for what access permission is allowed to be granted to various roles, e.g., role 113. For example, security rule 126 can set up a permissible scope of a name for role 113 or a permissible scope of a name for system resources 133 being specified by any security policies. As an example, security rule 126 can include various statements, e.g., "a role name must be a machine" or "a wildcard is allowed after a specific bucket to enable access to all objects in a single bucket."

Figure 4:
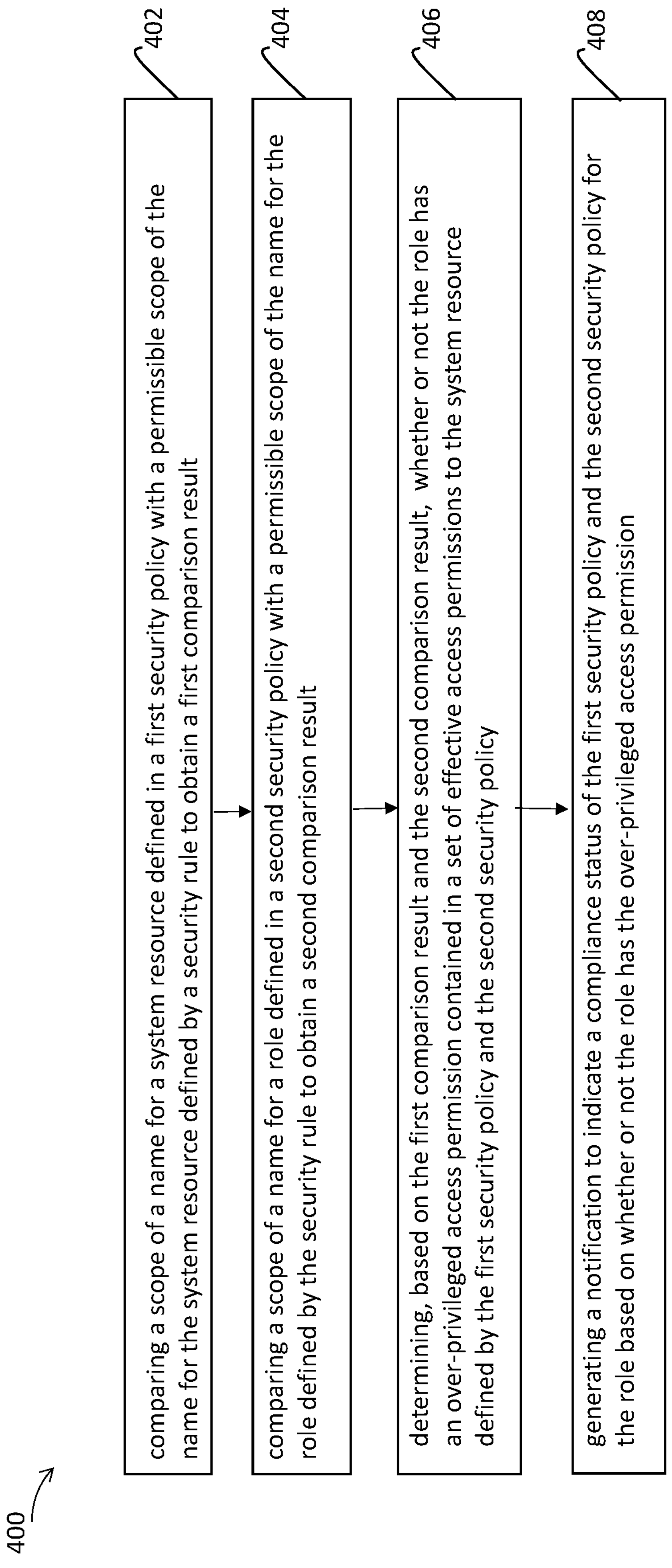
FIG. 4 is a flowchart illustrating a method for determining whether a role has an effective access permission defined by a set of security policies to a system resource that is over-privileged with respect to a security rule, according to some embodiments.

Often, the set of security policies defining the actual effective security permission for role 113 and the set of security rules 124 defining the permissible scopes for access permissions for role 113 are defined or generated at different times by different people within the enterprise. Hence, it is possible that the set of effective access permissions 125 actually granted to role 113 can be different from what is allowed to be granted to role 113 as defined by security rule 126 or the set of security rules 124. An access permission of the set of effective access permissions 125 is an over-privileged access permission when the access permission exceeds the permissible scope defined by security rule 126. Detection of an over-privileged access permission 128 is performed by compliance engine 122 based on security rule 126 of the set of security rules 124 that is defined based on security governance guideline 117. More details of detection of an over-privileged access permission are shown in FIG. 4.

In some examples, entity 111 can be resource objects to be used for authentication to access an account of IAM system 131. Entity 111 can have one or more associated roles, e.g., role 113. Role 113 can be stored in policy database 112. Role 113 can be used to delegate access to users, applications, or services that do not normally have access to system resources 133. For example, role 113 can be used to delegate access by a mobile app on computing device 140 to use system resources 133, which would not be normally accessible by a mobile application. Role 113 can be used to grant access to resources in one account to a trusted principal in a different account. Instead of being uniquely associated with one person, role 113 is intended to be assumable by anyone who needs it. Also, role 113 may not have standard long term credentials such as a password or access keys associated with it. Instead, role 113 can be provided with temporary security credentials for a session when the role is effective or valid.

Role 113 can include a machine 115 or a user 116. Machine 115 can be a representation of computing device 140, while user 116 can be a representation of person 142. User 116 can be an identity of person 142. Role 113 can be an identity that has specific access permissions. Role 113 can access system resources 133 based on access permissions defined by associated security policies. Role 113 can be associated with any number of different policies such as policy 113*a*, policy 113*b*, and policy 113*c*. A security policy, e.g., policy 113*a*, policy 113*b*, or policy 113*c* can be stored in a storage of cloud computing system 130.

Entity 111, e.g., role 113, can submit a request 119 for accessing system resources such as system resources 133 which are protected by IAM system 131. Request 119 can be allowed or denied based on the security policies, e.g., policy 113*a*, policy 113*b*, and policy 113*c*, associated with role 113. Request 119 can include a request context information, which is used to evaluate and authorize the request. The request context information can include actions or operations to be performed, resources upon which the actions or operations are performed, a principal sending request 119, environment data such as IP address, user agent, SSL enabled status, or the time of day; and resource data such as data related to the resource that is being requested. Information about the principal can include the policies that are associated with the principal. Resource data can include information such as a database table name or a tag on an Amazon EC2 instance.

If role 113 has been granted an over-privileged access permission, request 119 may be able to access system resources 133 that should not be allowed to be accessed according to security rule 126. However, IAM system 131 or enterprise system 110 may not know such an over-privileged access permission has been granted until some bad consequence has happened after role 113 has accessed the system resource. Any corrective action to its roles is therefore reactive and presents a potential security concern because roles are not evaluated until a request is made and granted, and potentially some bad consequence may have already happened.

In some examples, policy engine 120 can be used to evaluate the set of effective access permissions 125 of role 113 without performing any request. Policy engine 120 can be implemented as a separate component as shown in FIG. 1 or integrated as part of enterprise system 110. Policy engine 120 can include effective policy generator 121, the set of security rules 124, and compliance engine 122. Effective policy generator 121 can be configured to receive all policies associated with a role, such as policy 113*a*, policy 113*b*, and policy 113*c* associated with role 113, and generate effective policy 123 from the received policies.

Compliance engine 122 can be configured to receive the effective policy 123 indicating the set of effective access permissions 125 from effective policy generator 121, and security rule 126, and determine whether there is an over-privileged access permission 128. If the set of effective access permissions 125 contains over-privileged access permission 128, compliance engine 122 can identify the related security policies that generated such over-privileged access permission 128, and label the identified security policies having a compliance status as "non-compliant." On the other hand, if the set of effective access permissions 125 does not contain any over-privileged access permission, compliance engine 122 can label the effective policy 123 having a compliance status as "compliant". Accordingly, role 113 has a compliance status as "compliant". Therefore, operations performed by compliance engine 122 can improve the security of IAM system 131 or enterprise system 110, before any request is made to IAM system 131 by enterprise system 110. More detailed operations of compliance engine 122 are provided after FIGS. 2A-2B and 3A-3D are described below to provide more details for the set of effective access permissions 125 as inputs to compliance engine 122.

Figure 2A:
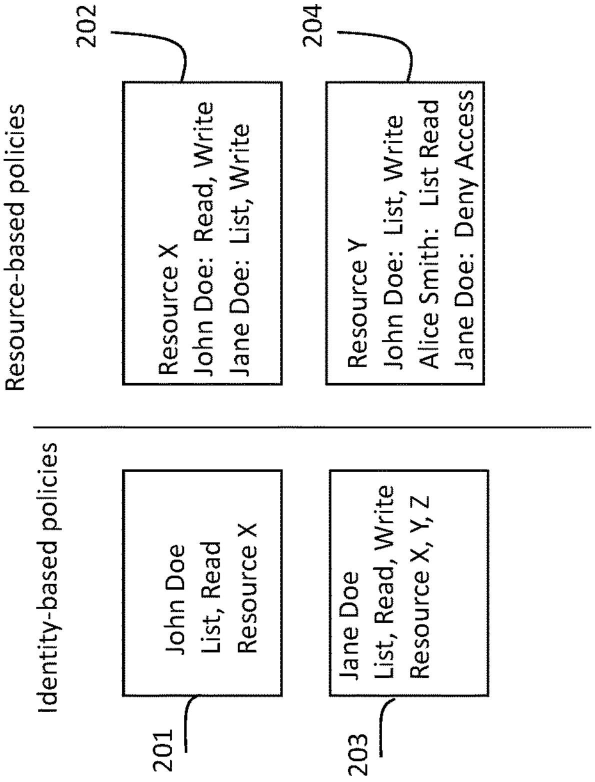
FIGS. 2A-2B are diagrams illustrating example security policies, according to some embodiments.
Figure 2B:
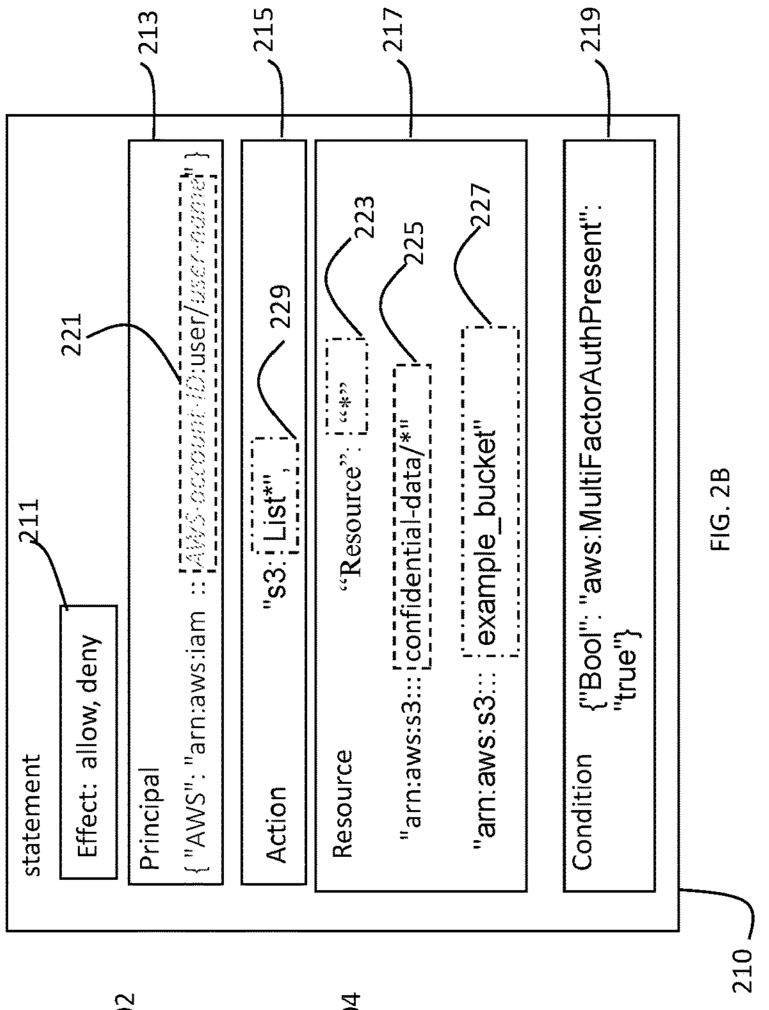

FIGS. 2A-2B are diagrams illustrating example security policies, according to some embodiments. FIG. 2A shows identity-based policy 201, identity-based policy 203, resource-based policy 202, and resource-based policy 204, which can be examples of policy 113*a*, policy 113*b*, and policy 113*c*, as shown in FIG. 1. A security policy, e.g., policy 201, policy 202, policy 203, and policy 204, can be stored in a storage of cloud computing system 130. A security policy, e.g., e.g., policy 201, policy 202, policy 203, and policy 204, can be an identity-based policy, a resource-based policy, a permissions boundary, an organizational service control policy (SCP), an access control list, a session policy, an inline policy, or any kind of security policy.

In some examples, an identity-based policy can be attached to an identity such as a user, a group of users, or a role, and grant permissions to the identity. For example, as shown in FIG. 2A, policy 201 specifies a user John Doe can list or read resource X, while policy 203 specifies a user Jane Doe can list, read, or write resource X, Y, Z.

In some examples, a resource-based policy can grant permissions to a principal (account, user, role, or federated user) specified in the policy. The permissions define what the principal can do with the resource to which the policy is attached. For example, as shown in FIG. 2A, policy 202 specifies for resource X, user John Doe can be granted read or write permission, user Jane Doe can be granted list or write permission. In addition, for resource Y, policy 204 specifies that user John Doe can be granted list or write permission, user Alice Smith can be granted list or read permission, and user Jane Doe can be denied any access.

In some examples, a security policy can be specified by natural language as shown in FIG. 2A. In some other examples, as shown in FIG. 2B, a security policy can be specified by one or more statements in a markup language or structured language. A security policy, e.g., policy 201, policy 202, policy 203, and policy 204, can be contained in a document specified by a markup language, such as a JavaScript Object Notation (JSON) document, a XML document, a YAML document, or any other documents containing statements in structured languages.

In some examples, as shown in FIG. 2B, a security policy 210 can include an effect statement 211, a principal statement 213, an action statement 215, a resource statement 217, a condition statement 219, or some other statements. Effect statement 211 can specify either Allow or Deny to indicate whether the policy allows or denies access. Principal statement 213 can be used to indicate an account, a user, a role, or a group of users to which the access permission is allowed or denied. Action statement 215 can include a list of actions to be performed on the one or more system resources that the policy allows or denies. Action statement 215 can include a read-only action, a view action, an update action, a write action, a delete action, or some other actions. Resource statement 217 can specify a list of resources to which the actions apply. Condition statement 219 can specify the circumstances under which the policy grants permission. In addition, there can be other statements, such as a version statement, a statement name (also referred to as an identification (ID)), and more, not shown.

In some examples, a statement can include a name for a role, e.g., name 221 within principal statement 213; a name for a system resource, e.g., name 223, name 225, name 227, within resource statement 217; or a name for an action, e.g., name 229 within action statement 215, or some other names. A name for a system resource can include one or more system resources. For example, name 223 includes only "*", which is a wildcard referring to any system resources in the account. On the other hand, name 227 includes "example_bucket", which refers to only one bucket stored in S3. In addition, name 225 includes "confidential-data/*", which refers to a set of system resources within the folder "confidential-data." The set of system resources referred to by a name for a system resource defines a scope of the name for the system resource. For example, a scope of name 227 includes only "example_bucket", while a scope of name 223 includes every system resource of the account, "*". A name for system resource can be defined in a resource statement or other statement for a security policy. Similarly, a scope of a name for a role can include one or more roles. For example, name 221 "AWS-account-ID:user/user-name" can refer to a single user. On the other hand, a name "AWS-account-ID:user/*" can refer to a group of users. When a scope of the name for a system resource in a security policy statement includes more than one system resource, the security policy statement can be applicable to any system resource whose name is included in the scope of the name for the system resource. Similarly, when a scope of a name for a role in a security policy statement includes more than one role, the security policy statement can be applicable to any role whose name is included in the scope of the name for the role.

FIGS. 3A-3D are diagrams illustrating example effective access permissions defined by a set of security policies, according to some embodiments. FIGS. 3A-3D illustrate security policy 311, policy 313, policy 325, policy 337, and policy 349, which can be examples of policy 113*a*, policy 113*b*, and policy 113*c*, as shown in FIG. 1.

Figure 3A:
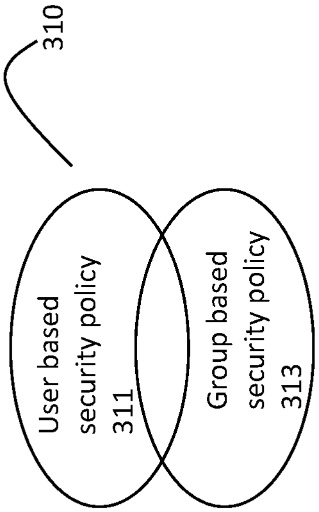
FIGS. 3A-3D are diagrams illustrating example effective access permissions defined by a set of security policies, according to some embodiments.

As illustrated in FIG. 3A, both policy 311 and policy 313 are identity-based policies. Policy 311 is applicable to a single role, e.g., role 113, while policy 313 is applicable to a group of roles including role 113. Hence, the scope of policy 311 is a set of roles including only one role, while the scope of policy 313 is a set of roles including a group of roles. In the description below, the scope of policy 311 can be simply denoted by the policy number "311", and the scope of policy 313 can be simply denoted by the policy number "313". For an action to be performed, an effective access permission can be in a union of the set of access permissions defined by policy 311 or policy 313. Hence, the set of effective access permissions 125 defined by policy 311 and policy 313 is $311 \cup 313$. Accordingly, given policy 311 and policy 313, for request 119, IAM system 131 can check both policy 311 and policy 313 for at least one Allow action for granting an access to the system resource for role 113. As long as one Allow action is found for a role, even if there is another policy statement that indicates a Deny action, the role is still allowed access based on the union of the scopes of the policy statements.

Figure 3B:
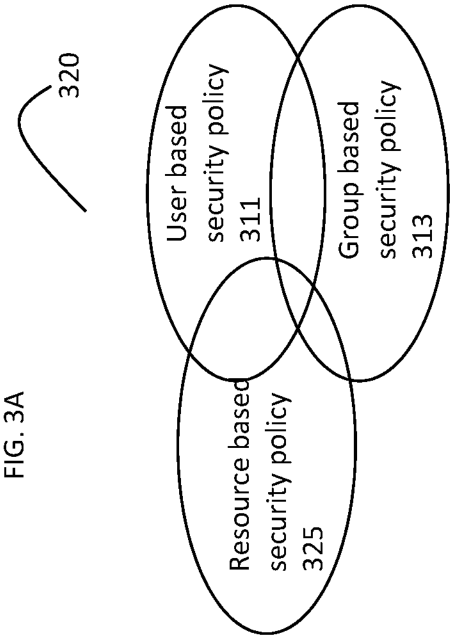

As illustrated in FIG. 3B, policy 325 is a resource-based policy. For an action to be performed, an effective access permission can be in a union of the set of access permission defined by policy 311, policy 313, and policy 325, e.g., $311 \cup 313 \cup 325$. Hence, for request 119, IAM system 131 can check policy 311, policy 313, and policy 325 for at least one Allow action for granting an access to the system resource.

Figure 3C:
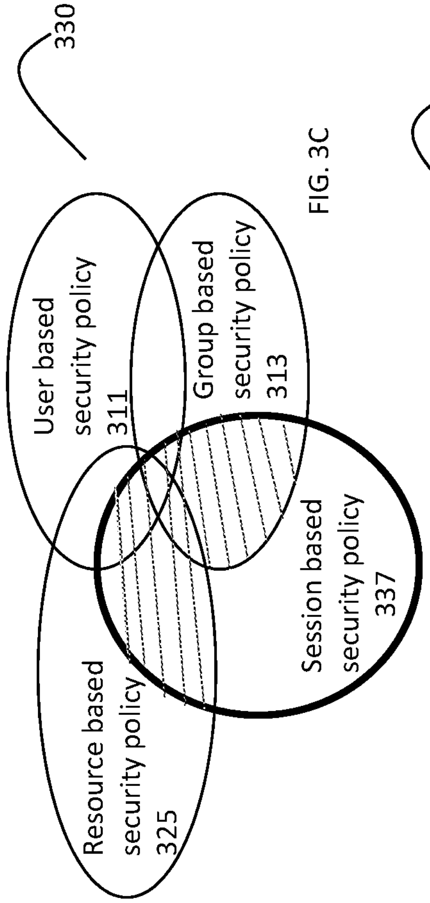

As illustrated in FIG. 3C, policy 337 is a session policy. In this case, the permissions from resource-based policy 325 are added to the role or user's identity-based policy 311 and policy 313 before the session is created. Session policy 337 limits the total permissions granted by the resource-based policy and the identity-based policy. The resulting session's permissions are the intersection of the session policies and either the resource-based policy or the identity-based policy, denoted as $(311 \cup 313 \cup 325) \cap 337$.

Figure 3D:
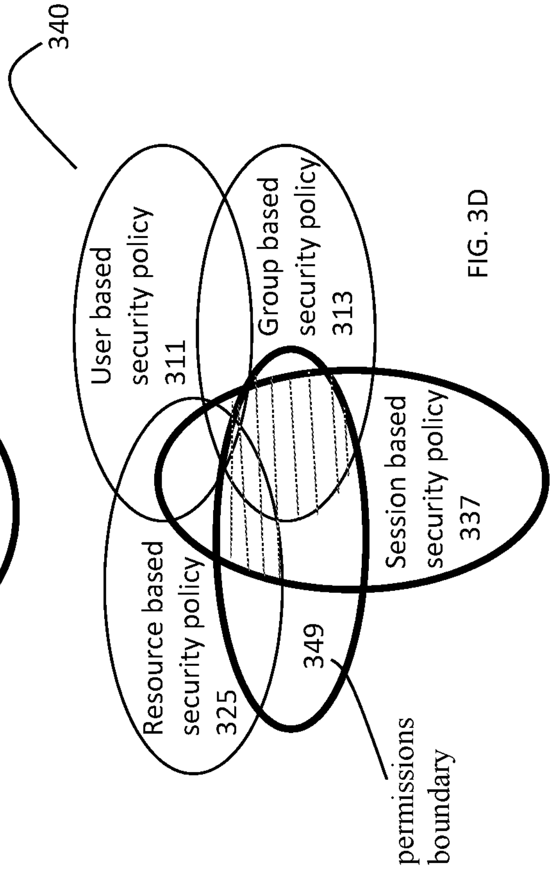

As illustrated in FIG. 3D, policy 349 is a permissions boundary, which sets the maximum permissions that an identity-based policy can grant to an entity (user or role). When a permissions boundary is set for an entity, the entity can perform only the actions that are allowed by both its identity-based policies or resource-based policies and its permissions boundaries. Hence, the effective access permission is $(311 \cup 313 \cup 325) \cap 337 \cap 349$.

The examples of effective access permissions shown in FIGS. 3A-3D are only for example purpose and are not limiting. There can be other kinds of security policies. An organization's service control policies (SCPs) can specify the maximum permissions for an organization or organizational unit (OU), which is applicable to individual roles, e.g., role 113. The SCP maximum applies to principals in member accounts, including each AWS account root user of the organization. If an SCP is present, identity-based and resource-based policies grant permissions to principals in member accounts only if those policies and the SCP allow the action. If both a permissions boundary and an SCP are present, then the boundary, the SCP, and the identity-based policy must all allow the action. In addition, access control lists (ACLs) are service policies that control which principals in another account can access a resource.

Accordingly, FIGS. 3A-3D illustrate examples for the set of effective access permissions, which can be examples of the set of effective access permissions 125 defined by a set of security policies. The set of effective access permissions 125 can be generated by effective policy generator 121 within policy engine 120. Effective policy generator 121 can receive all of the security policies applicable or associated with role 113, which is called the effective policy 123. Based on the effective policy 123, the set of effective access permissions 125 can be generated similar to examples shown in FIGS. 3A-3D. Furthermore, the set of effective access permissions 125 is provided as inputs to compliance engine 122 to detect whether there is an over-privileged access permission 128 with respect to security rule 126.

Referring back to FIG. 1, compliance engine 122 can be configured to receive the set of security rules 124 including security rule 126. Security rule 126 can be generated based on security governance guideline 117. In some examples, security rule 126 can be created based on an information security standard, an International Organization for Standardization (ISO)/International Electrotechnical Commission (IEC) 27000 series of standard, a National Institute of Standards and Technology (NIST) Special Publications 800 standard, an Information Security Forum (ISF) Standard of Good Practice (SoGP) standard, or a Control Objectives for Information and related Technology (COBIT) standard. In some examples, security rule 126 can be referred to as permission controls.

In some examples, security rule 126 can be specified in natural language (e.g., in plain English). For example, security rule 126 can include any or all of the following statements: "a resource name can include 5 characters, and followed by a wild card *"; "a role name must be a machine"; "a wildcard is allowed after a specific bucket to enable access to all objects in a single bucket"; or "a role name must be limited to a single entity account." In some examples, the English statement can be translated into a more structured statement. For example, "5 characters, and followed by a wild card *" can be translated into the format of "77777"+"*". The process of converting security rule 126 in natural language into structured statement can be performed by natural language processing, by analyzing the syntax rules and semantics rules of the security rule statements. Security rule 126 can include multiple statements, where each statement can impose a condition on a name for system resource, a name for role, a name for action, or some other conditions. All the statements together in security rule 126 can define a permissible scope of a name for system resources, which can be an intersection set of the allowable names for system resources defined by all statements in security rule 126. Similarly, all the statements together in security rule 126 can define a permissible scope of a name for a role, a permissible scope of a name for an action, and other permissible scopes.

Compliance engine 122 can detect whether there is over-privileged access permission 128 among the set of effective access permissions 125 with respect to security rule 126. Compliance engine 122 performs such detection based on a method presented in FIG. 4. In some other examples, compliance engine 122 can detect whether there is an over-privileged access permission 128 by directly receiving the security policies, e.g., policy 113*a*, policy 113*b*, and policy 113*c*. Compliance engine 122 can detect over-privileged access permissions without having to submit requests to IAM system 131. The request-response interactions between enterprise system 110 and IAM system 131 can be considered to occur independently of the policy evaluations performed by compliance engine 122 or policy engine 120. Since compliance engine 122 is located outside IAM system 131 and separated from IAM system 131, compliance engine 122 is implemented by a particular machine, instead of a generic computing system. For example, compliance engine 122 is separated from IAM system 131. On the other hand, a generic computing system such as IAM system 131 should be separated from compliance engine 122 to be protected, and should not be used to implement compliance engine 122. Therefore, this particular machine implementation of compliance engine 122 can provide added security protection for IAM system 131. Based on such an implementation on a special machine, compliance engine 122 can provide added security protection for IAM system 131. Some detailed operations performed by compliance engine 122 are shown in FIG. 4.

FIG. 4 is a flowchart illustrating a method 400 for determining whether a role has an effective access permission defined by a set of security policies to a system resource that is over-privileged with respect to a security rule, according to some embodiments. Method 400 can be performed by compliance engine 122, which can be operated by enterprise system 110. In addition, method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, compliance engine 122 can compare a scope of a name for a system resource defined in a first security policy with a permissible scope of the name for the system resource defined by a security rule to obtain a first comparison result. For example, compliance engine 122 can compare a scope of name 223, name 225, and name 227 for system resources within resource statement 217 of security policy 210, with a permissible scope of the name for system resources defined by security rule 126. The statement of security rule 126, "a wildcard is allowed after a specific bucket to enable access to all objects in a single bucket," defines a permissible scope for a name for system resources. Accordingly, the scope of name 227 includes only one system resource, "example_bucket". Hence, the scope of name 227 is within the permissible scope of a name for system resources defined by security rule 126. On the other hand, the scope of name 223 includes any system resources in the account, which is referred by "*". Hence, the scope of name 223 exceeds the permissible scope of a name for system resources defined by security rule 126. Furthermore, the scope of name 225 includes system resources within a folder "confidential-data/*", which can be within a single bucket. Hence, the scope of name 225 is within the permissible scope of a name for system resources defined by security rule 126 if the folder "confidential-data/" is within a single bucket. The first comparison result indicates whether the scope of the name for a system resource defined in the first security policy exceeds the permissible scope of the name for the system resource defined by the security rule.

In 404, compliance engine 122 can compare a scope of a name for a role defined in a second security policy with a permissible scope of the name for the role defined by the security rule to obtain a second comparison result. For example, compliance engine 122 can compare a scope of name 221 for a role within principal statement 213 of security policy 210, with a permissible scope of the name for the role defined by security rule 126. The scope of name 221 includes only one user account, "AWS-account-ID:user/user-name". If security rule 126 includes the statement, "a role name must be a machine", the permissible scope of a role must be a machine. Hence, the scope of name 221 for a role exceeds the permissible scope of a role as defined by security rule 126. On the other hand, if security rule 126 includes a different statement, "a role name must be limited to a single entity account", the permissible scope of a name for a role can include multiple roles within a single entity account. Hence, the scope of name 221, including "AWS-account-ID:user/user-name", is within the permissible scope of the name for the role as defined by security rule 126. Similarly, the scope of a role name, "AWS-account-ID:user/*", is within the permissible scope of the name for a role as defined by security rule 126. The second comparison result indicates whether the scope of the name for a role defined in the second security policy exceeds the permissible scope of the name for the role defined by the security rule.

In 406, compliance engine 122 can determine, based on the first comparison result and the second comparison result, whether or not the role has an over-privileged access permission contained in a set of effective access permissions to the system resource defined by the first security policy and the second security policy. For example, compliance engine 122 can determine role 113 has over-privileged access permission 128 when the scope of the name 223 for a system resource exceeds the permissible scope of the name for the system resource defined in security rule 126, or when the scope of the name 221 for a role exceeds the permissible scope of name for the role defined in security rule 126. On the other hand, compliance engine 122 can determine role 113 does not have an over-privileged access permission when the scope of the name for a system resource does not exceed the permissible scope of the name for the system resource defined in the security rule, and the scope of the name for a role does not exceed the permissible scope of the name for the role defined in the security rule.

In 408, compliance engine 122 can generate a notification to indicate a compliance status of the first security policy and the second security policy for the role based on whether or not the role has the over-privileged access permission. For example, the first security policy and the second security policy can represent any policy of effective policy 123. When role 113 is determined to have over-privileged access permission 128, compliance engine 122 can generate the notification to indicate that the compliance status of the effective security policies for role 113 is non-compliant. On the other hand, when determining role 113 does not have an over-privileged access permission, compliance engine 122 can generate the notification to indicate that the compliance status of the effective security policies for role 113 is compliant.

In some examples, there can be other operations not shown in method 400. For example, method 400 only illustrates operations performed on the first security policy and the second security policy. In some embodiments, method 400 can be performed in many iterations on all the security policies associated with a role. If the set of effective access permissions 125 contains over-privileged access permission 128, compliance engine 122 can identify the related security policies that generate such over-privileged access permission 128, and label the identified security policies having a compliance status as non-compliant. Similarly, role 113 has a compliance status as non-compliant. On the other hand, if the set of effective access permissions 125 does not contain any over-privileged access permission, compliance engine 122 can label effective policy 123 having a compliance status as compliant. Accordingly, role 113 has a compliance status as compliant.

In some examples, when the compliance engine 122 generates a notification to indicate an over-privileged access permission, the notification may be transmitted to enterprise system 110 to allow enterprise system 110 to take corrective action with respect to that role or the effective policy. For example, compliance engine 122 can generate a remediation security policy for correcting effective policy 123 including the name for the system resource or the name for the role that exceeds the permissible scopes defined by security rule 126. Other actions may be performed. For example, the role can be disabled or restricted from transmitting requests for system resources until the corrective action is taken. Such restrictions may be implemented by having a restriction module in compliance engine 122 to check any request for compliance before sending the request to IAM system 131. Actions taken against a role may impact user accounts associated with that role. In an embodiment, the notification may also be transmitted to IAM system 131 so that IAM system 131 may also track compliance with its permissive scope of access for its resources.

In some embodiments, because determining whether access permissions or roles are over-privileged occurs independently of access requests to IAM system 131, compliance engine 122 can efficiently perform persistent monitoring of the roles to determine whether all its roles are compliant with permissible scopes established by security rule 126. Accordingly, compliance monitoring may occur as needed: weekly, daily, or even 24/7. Such frequent compliance monitoring cannot be efficiently performed for request-based access control. Without the operations disclosed in this disclosure, enterprise system 110 would be required to submit requests from each role for each policy and for each permission in order to evaluate whether a permission is allowed for that role.

Figure 5:
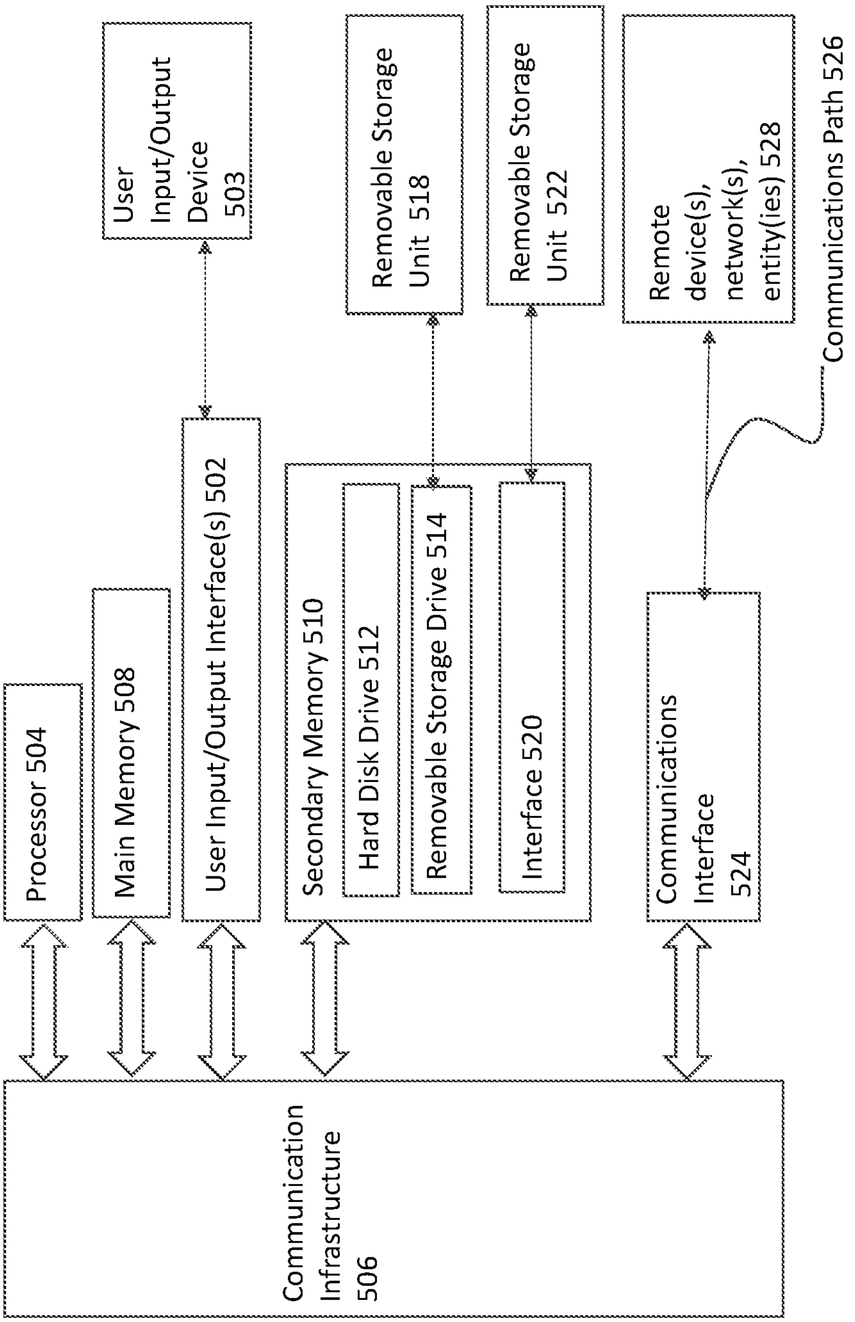
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein. For example, control logic may cause processor 504 to compare a scope of a name for a system resource defined in a first security policy with a permissible scope of the name for the system resource defined in a security rule to obtain a first comparison result; compare a scope of a name for a role defined in a second security policy with a permissible scope of the name for the role defined in the security rule to obtain a second comparison result; determine, based on the first comparison result and the second comparison result, whether or not the role has an over-privileged access permission contained in a set of effective access permissions to the system resource defined in the first security policy and the second security policy; and generate a notification to indicate a compliance status of the first security policy and the second security policy for role based on whether or not the role has the over-privileged access permission.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A computer-implemented method performed by a system, the method comprising:

evaluating, by one or more computing devices, whether a name of a system resource defined in a first security policy is an allowable name for the system resource defined by a security rule to obtain a first evaluation result;

evaluating, by the one or more computing devices, whether a name of a role defined in a second security policy is an allowable name for the role defined by the security rule to obtain a second evaluation result;

determining, by the one or more computing devices, that the role has an over-privileged access permission contained in a set of effective access permissions based on the first evaluation result and the second evaluation result;

identifying, by the one or more computing devices and based on the determining, a third security policy, related to the first security policy and the second security policy, that would also generate the over-privileged access permission, wherein the identifying is performed before requesting access to the system resource using the over-privileged access permission;

labeling, by the one or more computing devices, the first security policy, the second security policy, and the third security policy as non-compliant; and restricting, by the one or more computing devices, the role from transmitting requests for system resources in response to labeling the first security policy, the second security policy, and the third security policy as non-compliant.

2. The computer-implemented method of claim 1, further comprising:

generating, by the one or more computing devices, a remediation security policy for correcting the first security policy or the second security policy including the name of the system resource or the name of the role; and transmitting, by the one or more computing devices, to an entity that administers the role, an indication of the remediation security policy.

3. The computer-implemented method of claim 1, further comprising:

generating, by the one or more computing devices, a notification to indicate that the first security policy, the second security policy, and the third security policy are not compliant when the name of the system resource is not an allowable name for the system resource defined by the security rule or when the name of the role is not an allowable name for the role defined by the security rule.

4. The computer-implemented method of claim 1, wherein the first security policy and the second security policy are stored in a cloud storage.

5. The computer-implemented method of claim 1, wherein the first security policy and the second security policy are specified by one or more statements in a markup language.

6. The computer-implemented method of claim 1, wherein the set of effective access permissions comprises one or more of: an identity-based policy, a resource-based policy, a permissions boundary, an organizational service control policy (SCP), an access control list, and a session policy.

7. The computer-implemented method of claim 1, wherein the first security policy or the second security policy includes an action statement specifying a list of actions to be performed on the system resource and an effect statement indicating whether the policy allows or denies access.

8. The computer-implemented method of claim 7, wherein the action statement includes a read-only action, a view action, an update action, a write action, or a delete action.

9. An apparatus for managing system resources, the apparatus comprising:

a storage device configured to store a security rule; and a processor communicatively coupled to the storage device and configured to perform operations comprising:

evaluating whether a name of a system resource defined in a first security policy is an allowable name for the system resource defined in the security rule to obtain a first evaluation result;

evaluating whether a name of a role defined in a second security policy is an allowable name for the role defined by the security rule to obtain a second evaluation result;

determining whether the role has an over-privileged access permission contained in a set of effective access permissions based on the first evaluation result and the second evaluation result;

identifying, based on the determining, a third security policy, related to the first security policy and the second security policy, that would also generate the over-privileged access permission, wherein the identifying is performed before requesting access to the system resource using the over-privileged access permission;

labeling the first security policy, the second security policy, and the third security policy as non-compliant; and restricting the role from transmitting requests for system resources in response to labeling the first security policy, the second security policy, and the third security policy as non-compliant.

10. The apparatus of claim 9, wherein the operations further comprise:

generating a remediation security policy for correcting the first security policy or the second security policy including the name of the system resource or the name of the role; and transmitting, to an entity that administers the role, an indication of the remediation security policy.

11. The apparatus of claim 9, wherein the operations further comprise:

generating a notification to indicate that the first security policy, the second security policy, and the third security policy are not compliant when the name of the system resource is not an allowable name for the system resource defined by the security rule or when the name of the role is not an allowable name for the role defined by the security rule.

12. The apparatus of claim 9, wherein the first security policy and the second security policy are stored in a cloud storage.

13. The apparatus of claim 9, wherein the first security policy and the second security policy are specified by one or more statements in a markup language.

14. The apparatus of claim 9, wherein the set of effective access permissions comprises one or more of: an identity-based policy, a resource-based policy, a permissions boundary, an organizational service control policy (SCP), an access control list, or a session policy.

15. The apparatus of claim 9, wherein the first security policy or the second security policy includes an action statement specifying a list of actions to be performed on the system resource and an effect statement indicating whether the policy allows or denies access.

16. A non-transitory computer-readable medium storing instructions that, when executed by at least one processor, cause the at least one processor to perform operations comprising:

evaluating whether a name of a system resource defined in a first security policy is an allowable name for the system resource defined in a security rule to obtain a first evaluation result;

evaluating whether a name of a role defined in a second security policy is an allowable name for the role defined in the security rule to obtain a second evaluation result;

determining whether the role has an over-privileged access permission contained in a set of effective access permissions based on the first evaluation result and the second evaluation result;

identifying, based on the determining, a third security policy, related to the first security policy and the second security policy, that would also generate the over-privileged access permission, wherein the identifying is performed before requesting access to the system resource using the over-privileged access permission;

labeling the first security policy, the second security policy, and the third security policy as non-compliant; and restricting the role from transmitting requests for system resources in response to labeling the first security policy, the second security policy, and the third security policy as non-compliant.

17. The non-transitory computer-readable medium of claim 16, wherein the operations further comprise:

generating a notification to indicate that the first security policy, the second security policy, and the third security policy are not compliant when the name of the system resource is not an allowable name for the system resource defined by the security rule or when the name of the role is not an allowable name for the role defined by the security rule.

18. The non-transitory computer-readable medium of claim 16, the operations further comprising:

generating a remediation security policy for correcting the first security policy or the second security policy including the name for the system resource or the name for the role; and sending, to an entity that administers the role, an indication of the remediation security policy.

* * * * *